Sept 17, 1957 K. ZWICK 2,806,390
DRILLING HEAD
Filed Dec. 16, 1955 3 Sheets-Sheet 1

INVENTOR
KURT ZWICK,
by John B. Brady
ATTORNEY

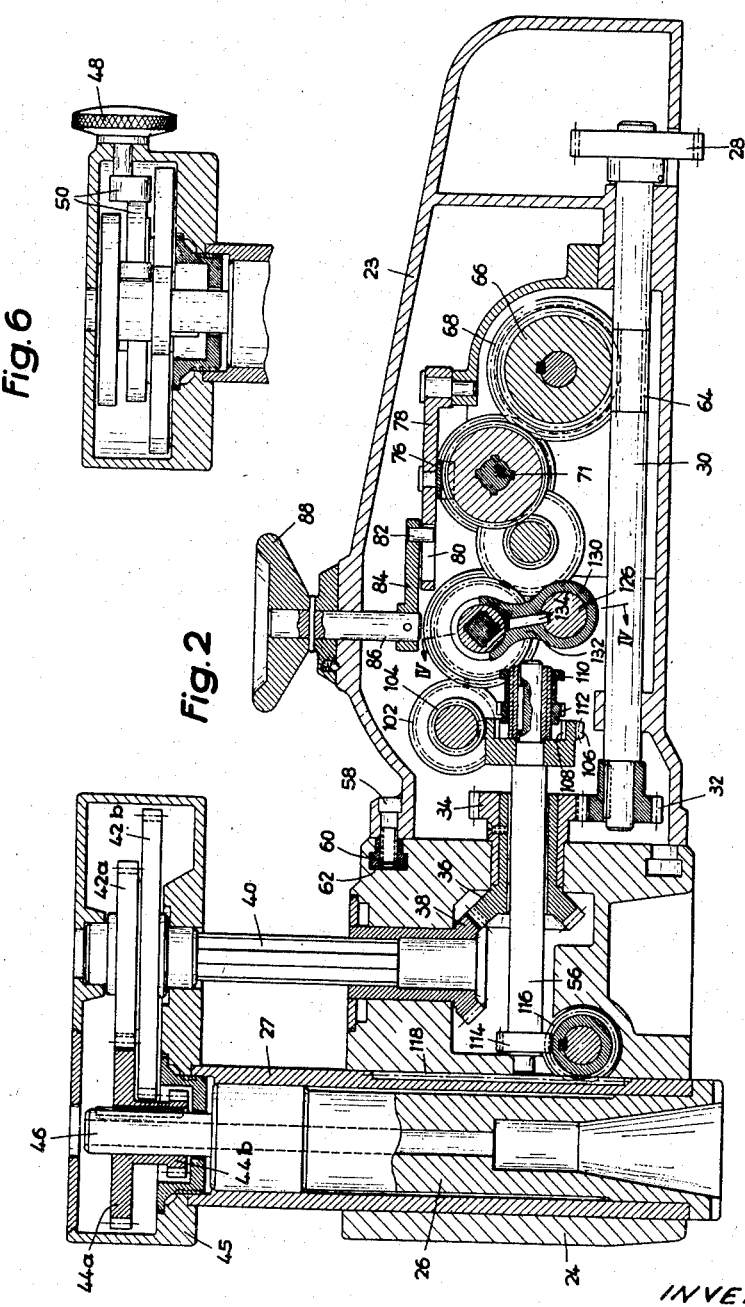

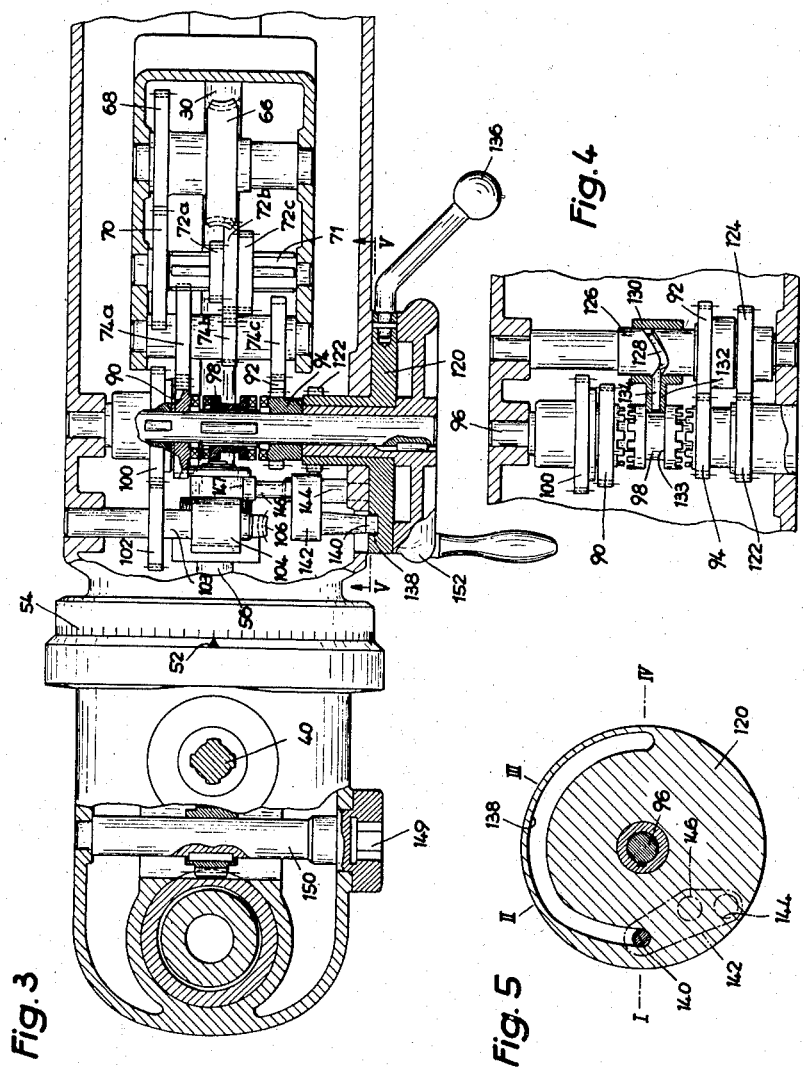

United States Patent Office

2,806,390
Patented Sept. 17, 1957

2,806,390

DRILLING HEAD

Kurt Zwick, Munich, Germany, assignor to Hans Deckel, Munich, Germany, and Friedrich Wilhelm Deckel, Zug, Switzerland Application December 16, 1955, Serial No. 553,609

Claims priority, application Germany December 23, 1954

3 Claims. (Cl. 77—5)

My invention relates to a boring or drilling head having an axially slidable and possibly swivelling boring or drilling spindle and capable of being fitted to a machine tool, such as a milling machine.

One of the objects of my present invention is to provide a reliable and structurally simple solution of the problem of arranging the feed of a swivelling boring spindle in a manner that permits of a compact construction of the boring head.

Another object of my invention is to provide a compact form of construction for a boring head wherein the spindle speed and the spindle feed can be controlled within the wide limits in a simple and practical way.

Still another object of my invention is to provide a boring head operative by manual controls for the fine and coarse adjustment of the axial position of the boring spindle, as well as for an automatic feed.

A further object of my invention is to provide a boring or drilling head assembly which avoids non-uniform heating of the different parts of the machine.

In principle the invention consists in the provision of a shaft, co-axial with the swivel axis of the boring spindle, through which the drive for the spindle feed is transmitted, and wherein the torque from the power unit is transmitted to the boring spindle through a primary change-speed gearing in the machine and then through a second change-speed gearing in the boring head, and wherein automatic feed is derived from the same power unit and transmitted to the spindle through a third change-speed gearing and an available speed gearing.

My invention will be more fully understood from the following specification by reference to the accompanying drawings which show one form of construction made in accordance with the invention and in which:

Fig. 2 is a longitudinal section through the drill head;

Fig. 3 shows the drill head in plan, partly in section;

Fig. 4 is a section along the line IV—IV in Fig. 2;

Fig. 5 is a section along the line V—V of Fig. 3;

Fig. 6 is a section along the line VI—VI of Fig. 1, and

Figures 1, 7:
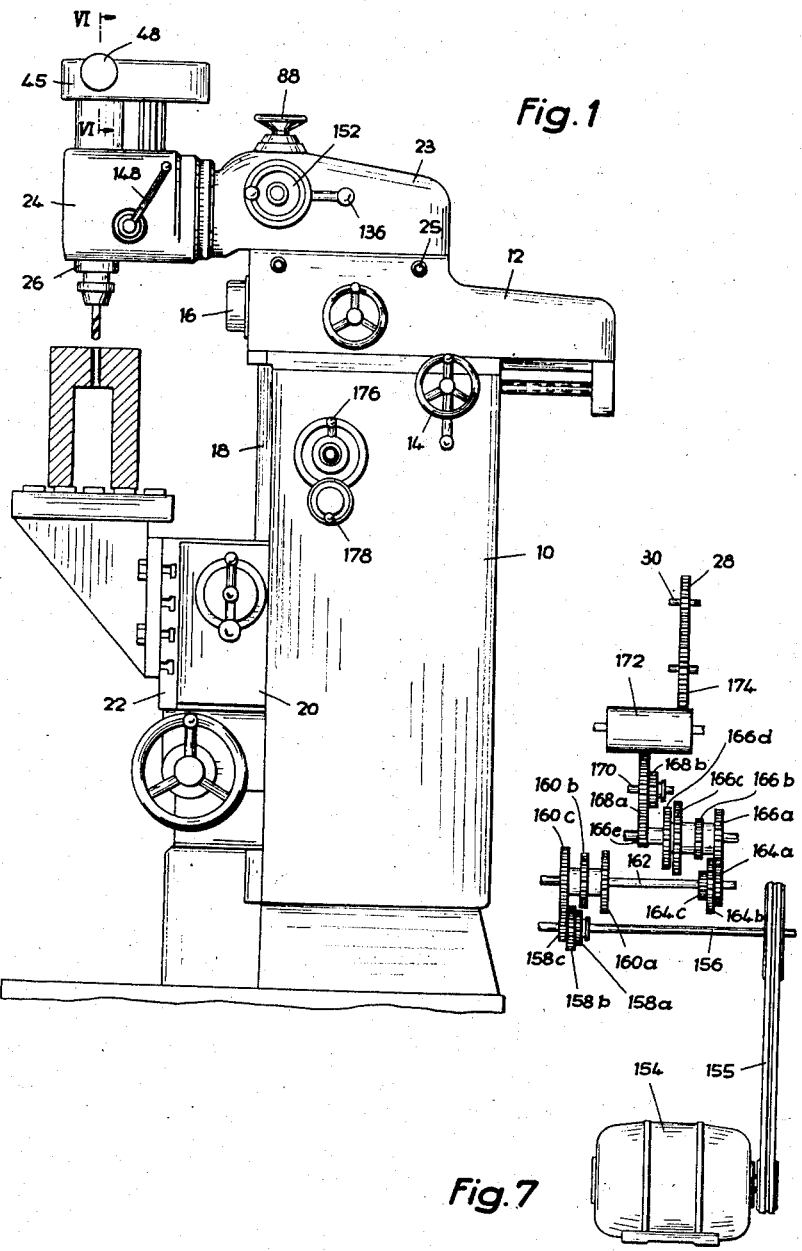
Figure 1 is a side elevation of a machine tool, for example, a milling machine equipped with a drill head in accordance with the invention.
Fig. 7 illustrates diagrammatically the gearing housed within the supporting structure of the machine.

The machine tool shown in Fig. 1 may be a milling machine of normal construction and comprises an upright column 10 which houses a power unit and a primary change-speed gearing which will be hereinafter described in greater detail. Mounted on the top of the column 10 is the traverse slide 12, for the milling spindle, where horizontal traverse movement of the slide is effected by a hand-wheel 14. A milling spindle 16 is located within the slide. A slide 20 with a vertical table 22 moves in vertical guideways 18 on the column 10.

For vertical or oblique cutting operations the milling spindle slide 12 mounts an additional gear box 23 to which a swivelling boring or drill head 24 is secured by means of a number of screws 25. The swivelling drill head 24 contains a boring or drilling spindle 26 and a second change-speed gearing. A third change-speed gearing with an available speed gearing is housed in the gear box 23.

The drive for the drilling spindle 26 is taken from the power unit through the primary change-speed gearing in the column 10 through a transmission member in the milling spindle slide 12, which will likewise be hereinafter described in greater detail, to a gear wheel 28 secured to a shaft 30 in the gear box 23. By means of a gear wheel 32 on shaft 30 the torque is transmitted to a gear wheel 34 and a bevel gear 36. The bevel gear 36 meshes with a second bevel ear 38 mounted on splines on an axially displaceable shaft 40 to which the torque is thereby transmitted. The upper end of this shaft 40 carries a pair of integral change-speed gears 42a and 42b which can be brought into engagement with two corresponding integral gears 44a and 44b. The two pairs of gears are housed in a gear box 45 secured to the axially displaceable sleeve 27 of the spindle 26, the sleeve and spindle being capable of vertical movement as one unit. The pair of change-speed gears 44a, 44b are axially slidable on splines at the upper end 46 of the drill spindle 26 which projects into the gear box 45, and the torque is thereby transmitted to the spindle 26.

The gears 44a, 44b can be axially shifted by means of a gear selector wheel 48 which carries a crank 50, so as to change the speed of revolution of the drill spindle 26 independently of the speed ratio transmitted from the change-speed gearing located in the upright supporting column 10 (Fig. 6).

The swivelling drill head 24 (Fig. 3) is provided with a reference mark 52 for registration with a graduated scale 54 on the fixed gear box 23. The drill head 24 swivels about the axis of a shaft 56 co-axial with the bevel gear 36, screws 58 and clamping blocks 60, engaging in an annular slot 62 in the drill head 24 being provided for the purpose of clamping the drill head in any desired position.

The drive for the automatic feed of the drill spindle 26 is derived from the shaft 30 on which is formed a worm 64 to engage a worm wheel 66. The rotary movement is transmitted to a pinion 68 co-axial with the worm wheel 66, and the pinion 68 meshes with a gear wheel 70. The latter is secured to a splined shaft 71, upon which is slidably mounted a change-speed gear unit comprising three gear wheels 72a, 72b and 72c, one of which may be brought into engagement with one of the three change-speed gears 74a, 74b and 74c of a corresponding integral set of gears. The change-speed gears 72a to 72c are shifted by means of a sleeve 76 freely rotatably mounted on an arm 78 so as to partially embrace the central wheel 72b. The arm 78 is pivotally mounted in the gear box 23 at one end and is provided at the other end with a slot 80 engaged by a pin 82 on a lever arm 84 which is fixed on a vertical shaft 86. Outside the gear box 23 the shaft 86 carries a gear selector wheel 88 which is secured thereto. Rotation of the gear selector wheel 88 is transmitted through the members 86, 84, 82, 78 and 76 and causes the shifting of the change-speed gears 72a to 72c so that three automatic feed speeds can be selected.

The torque for the automatic feed is further transmitted by a gear wheel 90 which meshes with the gear wheel 74a, and a gear wheel 94 which meshes with an intermediate pinion 92 (Fig. 4) engaged by a gear wheel 74c. The two gear wheels 90 and 94 are loose on a coupling shaft 96 and they each carry a ring of dog teeth which can be brought into engagement with a dog tooth clutch 98 slidably mounted on splines on the coupling shaft 96. By means of a shift mechanism hereinafter to be described the dog tooth clutch may be shifted to the right or the left to engage with the gear wheel 90 or 94 and the torque thereby transmitted to the coupling shaft 96 either in the one or the other sense of rotation. Keyed onto the coupling shaft 96 is a pinion 100 which meshes with a pinion 102. Fast with pinion 102 on the same shaft 103 is a worm 104 which transmits the torque to a worm wheel 106 loosely mounted on the shaft 56. The worm wheel is provided with an inner ring of dog teeth 108 which can be brought into engagement with the teeth 112 of a dog tooth clutch 110 slidably mounted on splines on an extension of the shaft 56 and operable by means of a shift mechanism likewise to be hereinafter described. When the members 106 and 110 are in engagement the torque is transmitted through the shaft 56 to a helical gear 114 fast therewith. The helical gear 114 engages a corresponding helical gear 116 mounted below it and the latter meshes with a corresponding rack 118 on the outside of the sleeve 27 of the drill spindle 26. Rotation of the helical gear 116 therefore feeds the spindle 26 downwards or upwards.

As has been described with reference to the drawings the drill head in the present form of construction swivels about the axis of the drive shaft 56 which serves to transmit the feed motion to the spindle 26. The feed is transmitted through the two helical gears 114 and 116, to the rack 118 on the sleeve 27 of the spindle 26. This arrangement offers a simple and compact form of construction of the swivelling drill head.

A shift mechanism or an available speed gearing is provided for coupling the dog tooth clutch 98 with the wheel 90 or the wheel 94 and the dog tooth clutch 110 with the worm wheel 106. This shift mechanism comprises a coupling disc 120 mounted outside the gear box 23 coaxially with and loose on the coupling shaft 96. The disc 120 has a cylindrical collar which projects into the interior of the gear box 23 and is provided with a toothed ring 122. The toothed ring 122 meshes with a pinion 124 which is fast on a control shaft 126 provided with a guide slot 128. A ring 130 embraces the control shaft 226 and carries an arm 132 with a semicircular end which rides in an annular groove 133 in the dog tooth clutch 98 and thereby determines the relative radial position of the ring 130 on the shaft 126. Projecting from the inside of the ring is a pin 134 which engages the guide slot 128 in the shaft 126. When the coupling disc 120 is turned by means of a lever handle 136 the resultant rotation of the control shaft 126 causes the pin 134 to slide in the guide slot 128 so that, according to the direction of rotation of the disc 120 the ring is axially displaced either to the right or the left and the dog tooth clutch is shifted into engagement either with the dog teeth on the gear wheel 90 or the gear wheel 94 (Fig. 4).

The coupling disc 120 is also provided—as shown in Fig. 5—with a guide slot 138 which is engaged by a pin 140 mounted on a lever arm 142. The lever arm 142 is rotatably mounted on a trunnion 144 located below the arm 142 within the casing which encloses the drill head 24. A second pin 146 likewise arranged on the lower arm 142 above the trunnion 144 engages an annular groove 147 in the dog tooth clutch 110. When the coupling disc 120 is rotated the pin 140 is moved in relation to the trunnion 144 owing to the radial obliquity of the end of the guide slot 138, the movement of the pin being either towards or away from the coupling shaft 96 according to the direction of rotation of the coupling disc. The pin 146 is forced to perform a corresponding movement and thereby brings the dog tooth clutch 110 into or out of engagement with the worm wheel 106.

There are two ways of manually adjusting the vertical position of the drill spindle 26. The first alternative is by means of the handlever 148 (Fig. 1) which can be inserted into the keyhole 149 (Fig. 3) of the shaft 150 upon which the helical gear 116 is mounted, and the shaft 150 can thus be turned by the handlever 148 (for manual coarse adjustment).

In the second alternative, rotation of a handwheel 152 keyed to the coupling shaft 96 co-axially with the coupling disc 120 outside the gear box 23 is transmitted through the members 96, 100, 102, 104, 106, 110, 56, 114 and 116, to the rack 118 of the sleeve 27 which carries the spindle 26 and thereby causes the drill spindle to be raised or lowered (for manual fine adjustment).

The power unit and the main multi-speed gearing in the column 10 of the machine and the transmission members in the spindle slide 12 will now be described in greater detail. The power unit, an electric motor 154, drives a shaft 156 by means of a V-belt 155—as shown in Figure 7. The shaft 156 carries an axially displaceable unit of three change-speed gears 158a, 158b and 158c. One of a corresponding unit of three change-speed gears 160a, 160b and 160c fast on a shaft 162 can be brought into engagement with one of the former. The shaft 162 also carries a further axially displaceable unit of three change-speed gears 164a, 164b and 164c, one of which can be brought into engagement with one of the first three of an integral unit of five change-speed gears 166a, 166b, 166c, 166d and 166e. One of the two latter wheels, either 166d or 166e, transmits the torque to a set of two change-speed gears 168a and 168b which are loose on a shaft 170, the gear 168a meshing with a cylindrical gear 172 which in turn transmits the torque to a pinion 174 in the spindle slide 12. The pinion 174 drives the gear wheel 28 in the gear box 23 of the drill head 24, which has already been described above.

By means of a gear selector crank handle 176 and a gear selector wheel 178, mounted on the outside of the column 10, the change-speed gear units 158, 154 and 168 can be shifted to give various gear ratios, or neutral, in a known manner that requires no further elucidation.

The control members 88, 120, 176 and 178 are provided with suitable reference marks to identify the various positions and ratios in the customary manner. Catches may also be provided to lock the various control positions.

While I have described my invention in certain of its preferred embodiments I realize that modifications may be made and I desire that it be understood that no limitations upon my invention are intended except as may be imposed by the scope of the appended claims.

What I claim as new and desire to secure by Letters Patent of the United States is as follows:

1. A machine tool comprising a base, a source of driving power and a gearing in said base, a gear box attachable on said base and carrying a drilling head swivelling about a swivel axis, a rotatable and axially movable drilling spindle in said drilling head, a gear assembly in the box in engagement with said source of driving power, a first gear means in the head for rotating said drilling head, and a second gear means in the head for axially moving said drilling head, said first and second gear means being in engagement with the gear assembly in said gear box, said first gear means comprising a hollow shaft coaxial with said axis of swivel, and said second gear means comprising a transmitting shaft passing through and coaxial with said hollow shaft.

2. A machine tool as set forth in claim 1, in which a first helical gear is mounted on the transmitting shaft and cooperates with a second gear mounted to turn about an axis transverse to the swivel axis, and meshing with a toothed rack on the outside of a sleeve supporting and axially movable with the drilling spindle.

3. A machine tool as set forth in claim 1, in which the hollow shaft is formed as a bevel gear cooperating with a second bevel gear mounted on a splined shaft arranged parallel to and movable with the drilling shaft.

References Cited in the file of this patent

UNITED STATES PATENTS

| | | |
|---|---|---|
| 1,284,894 | Hill | Nov. 12, 1918 |
| 1,397,696 | Nelson | Nov. 22, 1921 |